(12) United States Patent
Frolund et al.

(10) Patent No.: US 6,389,431 B1
(45) Date of Patent: May 14, 2002

(54) MESSAGE-EFFICIENT CLIENT TRANSPARENCY SYSTEM AND METHOD THEREFOR

(75) Inventors: Svend Frolund; Rachid Guerraoui, both of Mountain View, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/383,107

(22) Filed: Aug. 25, 1999

(51) Int. Cl.[7] .................................................. G06F 9/00
(52) U.S. Cl. ............................ 707/202; 707/201; 707/2; 709/227
(58) Field of Search ................................. 707/200–204, 707/1–10; 709/203, 9, 332, 201, 313

(56) References Cited

U.S. PATENT DOCUMENTS

| | | | |
|---|---|---|---|
| 5,721,909 A | * | 2/1998 | Oulid-Aissa et al. .......... 707/10 |
| 6,047,323 A | * | 4/2000 | Krause ........................ 709/227 |
| 6,076,108 A | * | 5/2000 | Courts et al. ................ 709/227 |
| 6,085,220 A | * | 7/2000 | Courts et al. ................ 709/201 |
| 6,115,744 A | * | 9/2000 | Robins et al. ................ 709/227 |
| 6,256,641 B1 | * | 7/2001 | Kasi et al. ................... 707/202 |

OTHER PUBLICATIONS

Kantikar et al., Jul. 28–31, 1998, "Two-stage trasaction processing in client–server DBMSs", University of Brooklyn, NY, pp. 98–105.*
S. Englert, Feb. 25–Mar. 1, 1991, "Load Balancing Batch and Interactive Queries in a High Parallel Environment", Tandem Computer Inc, pp. 110–112.*
Pelikan et al., Mar. 1998, "Experience with PACS in an ATM/Etherne switched network environment", Germany, pp. 26–29.*

* cited by examiner

Primary Examiner—John Breene
Assistant Examiner—Mohammad Ali

(57) ABSTRACT

A three-tier system is built up as: a single client application, a single server application, and a single database system. The server application provides a service that can be shared among multiple client applications. Server applications store their data in a database system. A client transparency mechanism and a server transparency mechanism are added. A database system on a clustered node is used for the database management. Server applications implement transactional behavior and the server side of the protocol so that the client applications may recover from server application and database system failures. The cluster application programming interface is used to determine when to retry. Information is stored in the database system so that the outcome of the transaction can be determined.

20 Claims, 4 Drawing Sheets

MESSAGE-EFFICIENT CLIENT TRANSPARENCY SYSTEM AND METHOD THEREFOR

CROSS-REFERENCE TO RELATED APPLICATION(S)

The present application contains subject matter related to a concurrently filed U.S. Patent application by Svend Frolund and Rachid Guerraoui entitled "MULTIPLE DATABASE CLIENT TRANSPARENCY SYSTEM AND METHOD THEREFOR" and identified by application Ser. No. 09/382,557.

The present application further contains subject matter related to a co-pending U.S. Patent application by Jayaram R. Kasi, Jari Koistinen, Ellis Chi, and Svend Frolund entitled "CLIENT TRANSPARENCY SYSTEM AND METHOD THEREFOR" which was filed Dec. 15, 1998, and is identified by Ser. No. 09/212,739.

TECHNICAL FIELD

The present invention relates generally to transaction processing systems (TPS) and more particularly to recovery from failures during transaction processing which minimizes user intervention.

BACKGROUND ART

Commonly, human end-users are exposed to many different failures and error situations in systems which are called transaction processing systems (TPS). TPSs are three-tier (client-server-database) systems which allow client applications to perform database transactions. For example, there are various reservation systems, such as for airlines, hotels, and car rentals, and financial systems, such as banking, credit card, and automated teller machines. In these systems, a customer or sales representative uses a client application that allows a user to query and update a database. The client interface allows the client to specify which database to add information to or to update. If a failure occurs, for example during an update, it is difficult for the client to know whether the update was actually performed or not.

As an example, for an Automated Teller Machine (ATM) failure, it is likely that the ATM customer would need to call the bank to find out whether the transaction was completed properly. This would generate more work for bank employees and create unsatisfied customers and very costly in terms of the lost business, reduced productivity, and unsatisfied customers.

Essentially, the client needs to query the database and see if the update has been performed and if it has not, to reissue the update. Even this solution is, however, not failure proof.

First, the system might not know what the values were before the update, and if the update is relative to the old value, the client might not be able to determine whether the update was performed or not. For example, if the ATM transaction involved a deposit to an account, the bank employee would have to have information regarding the previous balance and any other deposits and withdrawals that may have occurred to the account around the time of the failure.

Second, another client might have done an update after the first client's query and failed update. Therefore, the first client will not be able to determine with confidence whether the update was performed or not. Thus, the first client would have to guess what to do.

Thus, involving the client in the recovery of a failed request should be avoided to the largest possible extent. Unfortunately, complex commercial database systems and transaction processing systems generally fail to provide client transparency, or the ability to detect and correct problems without human intervention. Rather, it is expected that the failure recovery either be handled by the client or be coded into applications.

Embedding the failure recovery into the application code complicates the application considerably and is error prone.

Implementing error recovery logic is difficult and complex. Client applications as well as application servers currently need to implement error recovery as part of the application specific code. Further, the error recovery logic is not necessarily reusable for any application adhering to the described architecture.

In a TPS the client application code demarcates the transaction. If the transaction fails, the client application retries the transaction. This might or might not involve action from the end user. In the worst case the end client might need to reissue the transaction. There is a key problem with this approach in that there is a window in which a failure can occur when the client application does not know the outcome of the transaction. In the worst case the client needs to manually check if the transaction was committed and then take the appropriate action.

Replication protocols, such as ISIS and Horus, both from Cornell University, allow a service to be implemented by multiple servers, called a server group. Each request issued by a client application will be sent to all the servers. The protocol ensures that the requests processed by the servers of a group are processed synchronously according to some synchronization criteria. The states of servers are kept consistent by ensuring this synchronization. When new servers join a group the state is transferred from a server that is up to date.

The main idea of replication protocols is that if the states are kept consistent for two or more servers, one of them can fail without impacting the delivery of the service.

It is hard, and often impossible, to use replication solutions to solve reliability of services using database applications. The reason is that multiple servers can not simultaneously coordinate their writes to the same database. If different databases were used it would be difficult to keep the databases consistent. Both these problems are complicated further by the fact that databases can be accessed by other applications, causing the databases to diverge.

Thus, it is very difficult and often impossible to use replication protocols for the type of database (or state aware) applications for which the error recovery problem needs to be solved.

Even if it were simple to use replicated systems for database applications, they do not provide any support for automatically recovering from a failure during a database transaction. A client application would still need to determine the outcome of the transaction.

Basically, although replication protocols can provide error recovery to certain types of systems, they are not suitable for database applications. Secondly, it would still be necessary to determine the outcome of failed calls in some manner.

Traditional, high availability solutions for database-centric applications are typically based on clusters. A cluster consists of multiple computers, called nodes. Each node is capable of running a database, and when the database fails, it is restarted by cluster manager software. The consistency model for the database is based on the notion of "rollback" where the database is restarted in some previous, consistent state. The transactions that were being executed when the database failed are aborted.

Traditional cluster mechanisms limit database down time because they immediately restart the database. However, the failure is visible to the database clients. The clients may experience lost connections to the database, aborted transactions, and indeterminate transactions where the outcome cannot be determined.

The Microsoft Transaction Service (MTS) provides a programming model and runtime system for three-tiered, component-based systems. MTS provides transactional semantics for the components in the middle tier. These components are annotated communications (COM) components where the annotations capture transaction composition across components. From an application architecture perspective, MTS supports a programming model in which the middle tier contains stateless objects and transactions are demarcated in the middle tier.

However, MTS does not provide error-recovery logic. Client applications using MTS-controlled objects must manually and explicitly implement error recovery logic to determine the outcome of database transactions. Moreover, client applications will have to explicitly handle failures of middle-tier objects: they must catch exceptions that occur when middle tier objects fail and they must subsequently connect to a new middle tier object.

An answer has long been sought to solve the above problems, but it has also long eluded those skilled in the art.

DISCLOSURE OF THE INVENTION

The present invention is targeted to three-tier transaction processing systems (TPSs) built up as: a single client application (CA), a single server application (SA), and a single database system (DBS). The client application implements an application that requires data and services that are best realized as distributed resources. A SA represents such a resource. The SA provides a service that can be shared among multiple CAs. SAs store their data in a database. A client transparency mechanism (CTM) and a server transparency mechanism (STM) are added, and both can be represented as conventional state machines. A database on a clustered node is used for the database management. SAs implement transactional behavior. The STM implements the server side of the protocol so that the CAs may recover from SA and database failures. The cluster application programming interface (API) is used to determine when to retry. Information is stored in the database so that the outcome of the transaction can be determined.

The present invention provides a simpler programming model for CAs and SAs where the error recovery logic is embedded in middleware.

The present invention further provides very high-availability from a client's perspective since most failures can be automatically recovered.

The present invention further provides a TPS in which CAs do not need to do outcome determination after a failure and a subsequent system recovery.

The present invention further provides a TPS in which SAs do not need to explicitly reconnect to database or request retry from the CA.

The present invention further provides a TPS in which the solution masks communication and node failures for the CA.

The present invention further provides a high-availability TPS which uses a data store with a notion of transaction.

The present invention further provides a TPS in which the CA uses stateless servers that uses data-stores to save information and system state.

The present invention further provides a TPS in which an operation request will correspond to one transaction.

The present invention further provides a TPS in which all SAs use the same data store.

The present invention further provides a TPS in which data-stores are made highly available using a fault-tolerance solution, such as a cluster.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
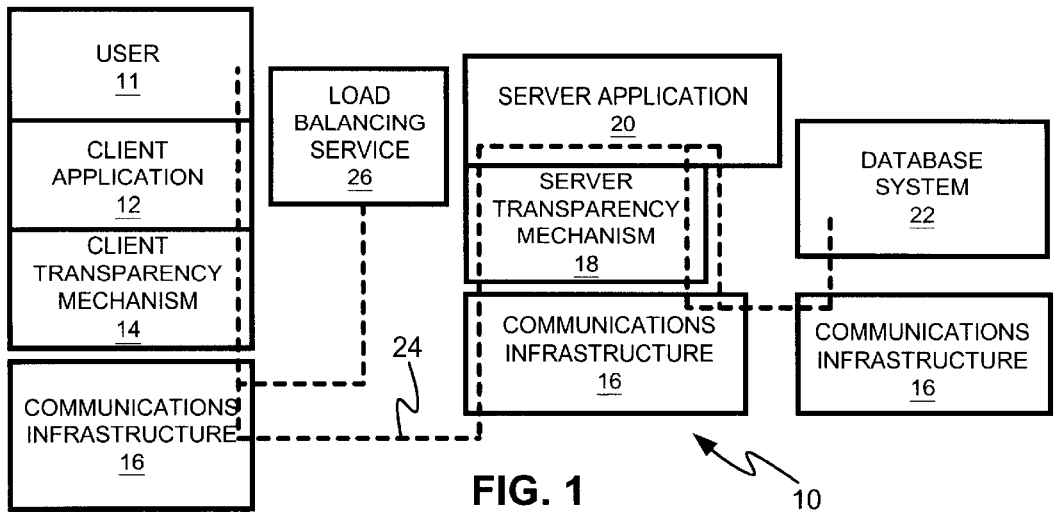
FIG. 1 is a three-tier TPS incorporating the client transparency system of the present invention.

Referring now to FIG. 1, therein is shown a transaction processing system (TPS) 10. A user 11 of the TPS 10 would interact with a client application (CA) 12, which could be one personal computer in a large network. The CA 12 has an attached client transparency mechanism (CTM) 14. The CTM 14 is connected to a conventional communications infrastructure (CI) 16.

The CI 16 represents communications systems such as telephone lines, dedicated lines, etc. which allow both local and remote communications between systems connected to it.

A plurality of server transparency mechanisms (STMs) 18 (18-1, 18-2, etc., not shown) are connected to the CI 16 and a plurality of server applications (SAs) 20 (20-1, 20-2, etc., not shown) are each connected to their respective STMs 18. Generally, there will be a plurality of SAs 20 which implement transactional behavior. The plurality of STM's 18 implement the server side of the protocol which will herein be described, so that CAs may recover from application and database failures. The SAs 20 are further connected directly to the CI 16.

A database system (DBS) 22 is further connected to the CI 16. The DBS 22 stores data persistently and is one which can be restarted fast with data consistency guarantees to enable fast recovery from faults. The systems that exhibit traditional behavior may be implemented as databases on a clustered node. Further, the DBS 22 is capable of storing information so that the outcome of transactions can be determined.

A load balancing service (LBS) 26 is connected to the CI 16. The LBS 26 registers the SAs and balances the load between the SAs having the same functionality so as to avoid overloading any particular SAs. In an alternative embodiment, the LBS 26 could balance load by other methods, such as a simple round-robin allocation method.

A bi-directional communication path 24 interconnects all the entities involved in the TPS 10.

Figure 2:
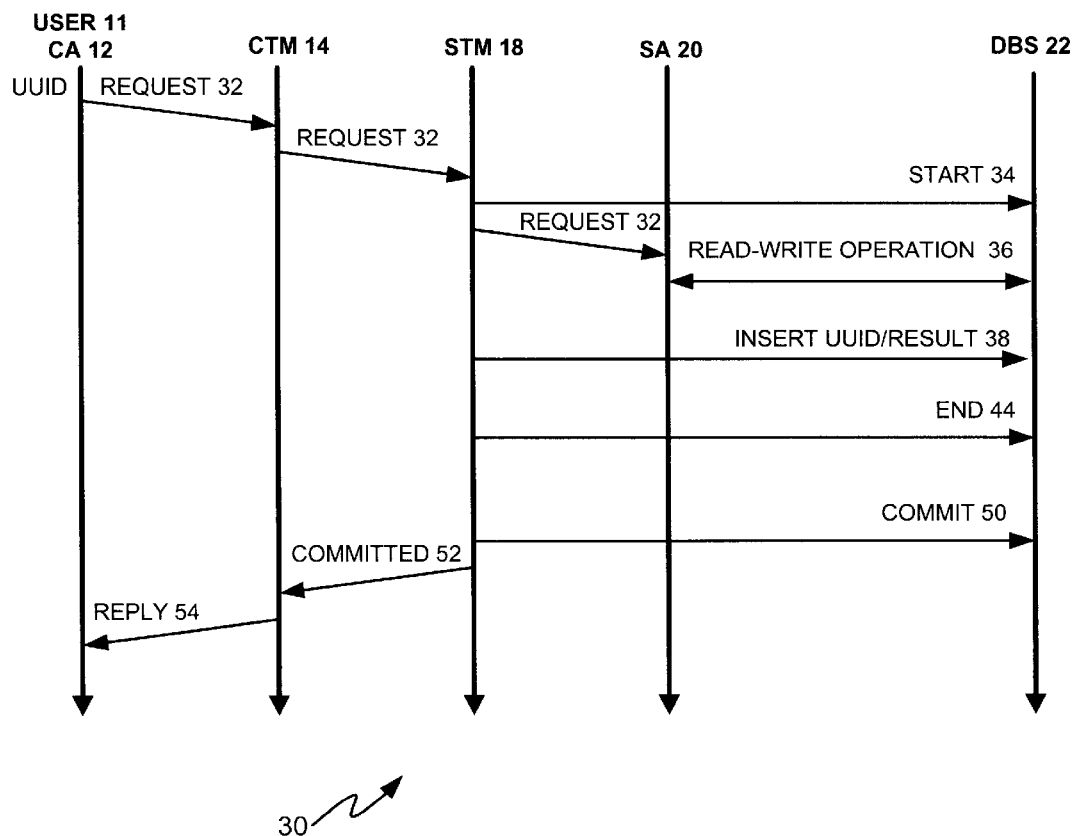
FIG. 2 is a timeline diagram for a problem-free TPS incorporating the present invention.

Referring now to FIG. 2, therein is shown the basic structure of the method of the present invention which is depicted as a "timeline diagram" 30. The "timeline diagram" 30 shows the order in which components of the TPS 10 exchange messages across the CI 16. The vertical lines represent the system components, which are the CA 12, the CTM 14, the STM 18, the SA 20, and the DBS 22. The user 11 is shown with the CA 12. Horizontal lines represent messages. A line with one arrow represents a single message with the arrow indicating the direction of the message from the sender to the receiver. A line with two arrows represents bidirectional messaging. The lines with two arrows allow for abstraction of the exchange of multiple messages as one logical exchange.

In FIG. 2 the messages are shown as part of a single end-to-end activity when no failures occur during the activity. The messages are more fully described as XA commands from a library of subroutines whose interfaces are defined by the X/Open Consortium and whose implementation is supported by many database vendors. The X/Open Consortium is an independent, worldwide, open systems organization supported by most of the world's largest information system suppliers, user organizations, and software companies. The consortium combines emerging standards into a comprehensive, integrated, high-value, and useable system environment called the Common Applications Environment (CAE). This environment covers the standards, above the hardware level, that are needed to support open systems. The CAE environment are defined and contain among other things, an evolving portfolio of practical application programming interfaces (APIs), which significantly enhance the portability of application programs at the source code level, and definitions of and references to, protocols and protocol profiles, which significantly enhance the interoperability of applications.

The user 11 first inputs a transaction into the CA 12. The CA 12 generates a universally unique identifier (UUID) for the transaction and then sends a transactional "request" 32, which contains the UUID and information for the transaction, to the CTM 14. The CTM 14 resends it to the STM 18. The STM 18 then sends a "start" 34 message to the DBS 22 to start a transaction. After the "start" 34, the STM 18 sends the "request" 32 to the SA 20. In response to the "request" 32, the SA 20 implements a "read/write" 36 with the DBS 22 and manipulates the DBS 22 in an application-specific manner. For example, the application-specific manner could be a banking transaction such as a deposit, withdrawal, transfer between accounts, etc.

When the manipulation is complete, the STM 18 sends an "insert UUID/result" 38 command to the DBS 22 which appends the UUID for the transaction and a corresponding result of the transaction to a storage area within the DBS 22. After the "insert UUID/result" 38 command, the STM 18 sends an "end" 44 to the DBS 22 which indicates to the DBS 22 that manipulations are complete. The STM 18 then sends a "commit" 50 command to the DBS 22 and a "committed" 52 message to the CTM 14 as the response to the "request" 32. The CTM 14 then provides a "reply" 54 message to the CA 12 to indicate completion of the transaction. The "reply" 54 message contains the result of the "request" 32. For example, the "request" 32 is a deposit to a checking account and the "reply" 54 containing the result is the balance in the checking account after the deposit.

The "commit" 50 command memorializes the completed manipulation to the DBS 22. Until the completed manipulation is committed, it is transient and can be rolled back. The DBS 22 saves the UUID and the corresponding result of the manipulation for later recall to handle failures, or undesirable conditions, that happen during a server-side commit operation. If the CA 12 observes such failures, it does not know, per se, if the transaction was committed before the failure happened. If the transaction was not committed, the CA 12 must retry the transactional request. However, if the transaction was committed, the CA 12 must not retry the transactional request; otherwise, the transaction would be duplicated. The STM 18 sends the UUID and inserts it and the result corresponding to that UUID into the DBS 22 as part of the server-side transaction. The CTM 14 can then use this UUID as a handle to the transaction and determine if the transaction has been committed. Since the UUID insertion is part of the transaction, the UUID will be in the database if and only if the transaction has been successfully committed. The STM 18 transmits the "commit" 50 command before it provides the "committed" 52 message to the CTM 14.

As can be seen from the above, the method has a single-phase nature. One logical method invocation involves one actual application of the STM 18 and DBS 22 messages. The initial invocation executes the transaction and commits it as a completed transaction in the DBS 22. The single-phase nature alleviates message congestion between the CTM 14 and the STM 18 and reduces delays in processing the transaction by not having to wait for the CTM 14 to respond. Accordingly, the CTM 14 submits a single invocation and waits for the "committed" 52 message that contains the result of the "request" 32 from the STM 18. If the CTM 14 does not receive the "committed" 52 message, it needs to retry the method invocation. The CTM 14 should not perform the retry if the transaction has already been committed at the server side since that would cause the transaction to be executed twice.

Figure 3:
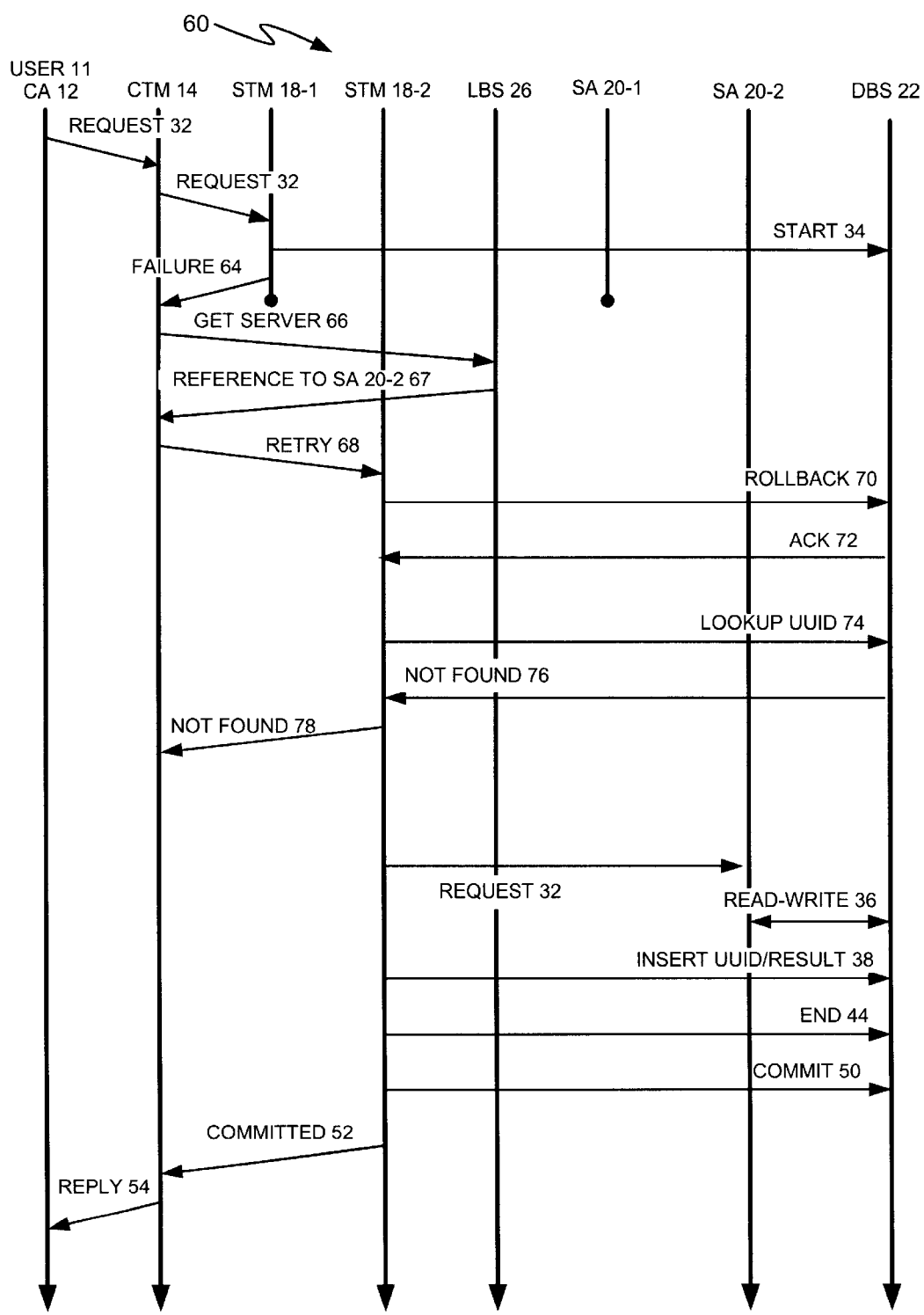
FIG. 3 is a timeline diagram for a TPS incorporating the present invention having an early server application problem.

Referring now to FIG. 3, therein is shown the operation of the method of the present invention when there is a failure, or undesirable operational condition, during the "request" 32. The method of operation is depicted as a "timeline diagram" 60. It should be noted that the present invention is described by its functionality in handling a couple of representative failure scenarios. It would be obvious to those having ordinary skill in the art to understand how the system and method operate without undue experimentation.

Thus, FIG. 3 illustrates the method of operation when a SA 20-1 fails part way through a transaction during the "request" 32. As well known to those skilled in the art, server applications have various means of indicating when they have failed. These means include the application of a hearbeat, pinging, or timeout.

The user 11/CA 12/CTM 14 send the "request" 32 through the STM 18-1 to SA 20-1, and the STM 18-1 sends "start" 34 to the DBS 22. If a failure occurs at the SA 20-1 before the transaction has completed, the CTM 14 recognizes a "failure" 64 which causes the CTM 14 to retry the method invocation. The "failure" 64 causes the server process to terminate, and the CTM 14 cannot retry the method invocation against the same server application SA 20-1. The CTM 14 needs to retry against a different server.

Multiple SAs provide the same functionality and CTMs can switch between SAs that provide the same functionality. To switch SAs, the CTM 14 uses the LBS 26 which stores references to the SAs and STMs and keeps track of which SAs provide the same functionality, such as SA 20-2, SA 20-3, etc. When the SAs start up, they register with the LBS 26 under a logical name that captures their functionality. For example, SAs could register under the names of the interface that they support. CA 12 and CTM 14 then use this logical name to access SAs through the LBS 26.

The primary purpose of the LBS 26, with respect to the functionality of the method of the present invention, is to map these logical names to SAs and thereby manage the redundancy in the middle tier. However, its primary purpose in the TPS 10 is to balance the load among all the SAs that implement the same interface during normal operation.

After the user 11/CA 12/CTM 14 send out the initial "request" 32 to the STM 18-1, the STM 18-1 and DBS 22 begin communication with a "start" 34.

With a failure in SA 20-1 sometime after the "start" 34, CTM 14 determines that the "failure" 64 has occurred in the STM 18-1. The CTM 14 then sends a "get server" 66 message to the LBS 26 which selects a server application that is available and has the same functionality, such as SA 20-2, with "reference to SA 20-2" 67. The CTM 14, without the intervention of the user 11, then sends a message, "retry" 68, to the STM 18-2. The "retry" 68 message is similar to the original "request" 32 and includes the UUID of the original "request" 32 which failed before completion. In response, the STM 18-2 sends a "rollback" 70 to the DBS 22 in order to free up resources, such as database locks, held by the failed transaction. When the rollback is complete, the DBS 22 is rolled back to the last committed transaction, and sends an acknowledgement message, "ack" 72, back to the STM 18-2.

With the receipt of the "ack" 72, the CTM 14 proceeds with a request, "lookup UUID" 74, to the DBS 22. The DBS 22 proceeds to retrieve a UUID and a result corresponding to the "request" 32. In this case, the DBS 22 has not committed to the transaction for the "request" 32 and the UUID and the result is not found. Accordingly, the DBS 22 sends a "not found" 76 to the STM 18-2. The STM 18-2 in turn sends a "not found" 78 to the CTM 14 and resends the "request" 32 to SA 20-2 and, without failures, will proceed with the same transaction, which is the same as shown in FIG. 2 and which utilizes the same messages with the same numbers as shown therein.

In the alternative situation in which the DBS 22 matches the UUID with a corresponding result, the DBS 22 returns the result to the STM 18-2 and CTM 14. The CTM 14 sends the result in "reply" 54 to the user 11/CA 12 in response to the "request" 32. Thus, the user 11/CA 12 receives a result in response to the "request" 32 and is unaware of failures within the TPS 10. The user 11 and the CA 12 are not involved in the recovery from the failure of the SA, so the failure recovery is transparent to them.

Figure 4:
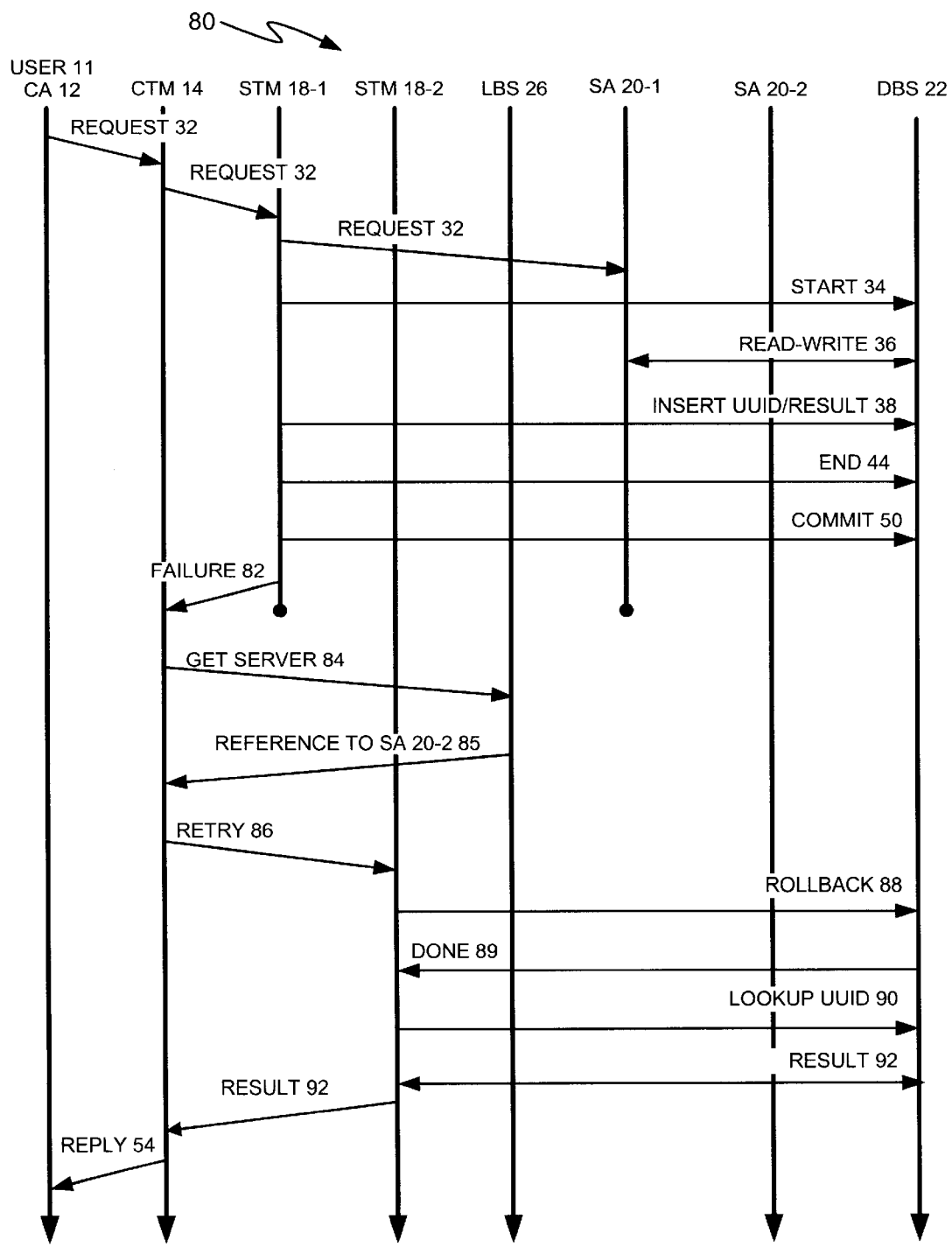
FIG. 4 is a timeline diagram for a TPS incorporating the present invention having an indeterminate time server application problem.

Referring now to FIG. 4, therein is shown the method of the present invention when there is a failure during the commit phase when it is not possible to determine when a server failed. The "timeline diagram" 80 shows the user 11/CA 12/CTM 14 providing the "request" 32 to the STM 18-1. After a "start" 34 from the STM 18-1 to the DBS 22, the STM 18-1 causes the SA 20-1 to execute the "request" 32 with "read/write" 36 operation and sends an "insert UUID/result" 38 followed by an "end" 44, and a "commit" 50 to the DBS 22, but the SA 20-1 fails while committing the transaction.

The CTM 14 recognizes the "failure" 82, and can not determine if the transaction was actually committed in the DBS 22 because the CTM 14 cannot tell exactly when the SA 20-1 failed.

To determine the outcome of the transaction, the CTM 14 first obtains a new server, SA 20-2, from the LBS 26 using the "get server" 84 and obtaining the "reference to SA 20-2" 85. The CTM 14 then sends a message, "retry" 86, to the STM 18-2 for it to determine if the transaction is in the DBS 22. The "retry" 86 includes the UUID of the in-progress transaction when the failure occurred. The STM 18-2 sends a "rollback" 88 command to the DBS 22 to ensure that some other server application has not already started the transaction against the DBS 22. Once the DBS 22 has successfully rolled back, it sends a "done" 89 message to the STM 18-2. Upon receipt of the "done" 89 message, the STM 18-2 sends a "lookup UUID" 90 command to the DBS 22 to determine if the transaction was committed. For example, where the transaction did not commit, the DBS 22 will return a not found message in which case the STM 18-2 sends the "request" 32 to the SA 20-2 to process the transaction.

Assuming that the failure occurred after the "commit" 50 was executed, the DBS 22 matches the UUID and retrieves a "result" 92 of the transaction corresponding to that UUID and sends the "result" 92 to the STM 18-2 which resends it to the CTM 14. The CTM 14 sends the result in "reply" 54 to the user 11/CA 12 in response to the "request" 32. Thus, the user 11/CA 12 receives a "reply" 54 having a result that is responsive to the "request" 32 and is unaware of failures within the TPS 10. The user 11 and the CA 12 are not involved in the recovery from the failure of the SA, so the failure recovery is transparent to them.

The "rollback" 86 command prevents multiple servers from executing the same transaction at the same time. This prevents duplicity of transactions which may occur during failure recovery of the TPS 10 from an undesirable operational condition.

In the TPS 10 of the present invention, the CTM 14 and the STM 18 provide automatic error recovery without client application or human user participation. The CTM 14 and the STM 18 implement a protocol which is hidden from conventional SAs 20 and the CA 12.

As would be evident to those having ordinary skill in the art, the TPS 10 is capable of handling a plurality of failure modes. For example, failure of a SA 20-1 during the initial request, a failure of the SA 20-1 just before committing, and the failure of the SA 20-1 after committing. Similar failures would be that of the DBS 22 or of the LBS 26 during an update.

Figure 5:
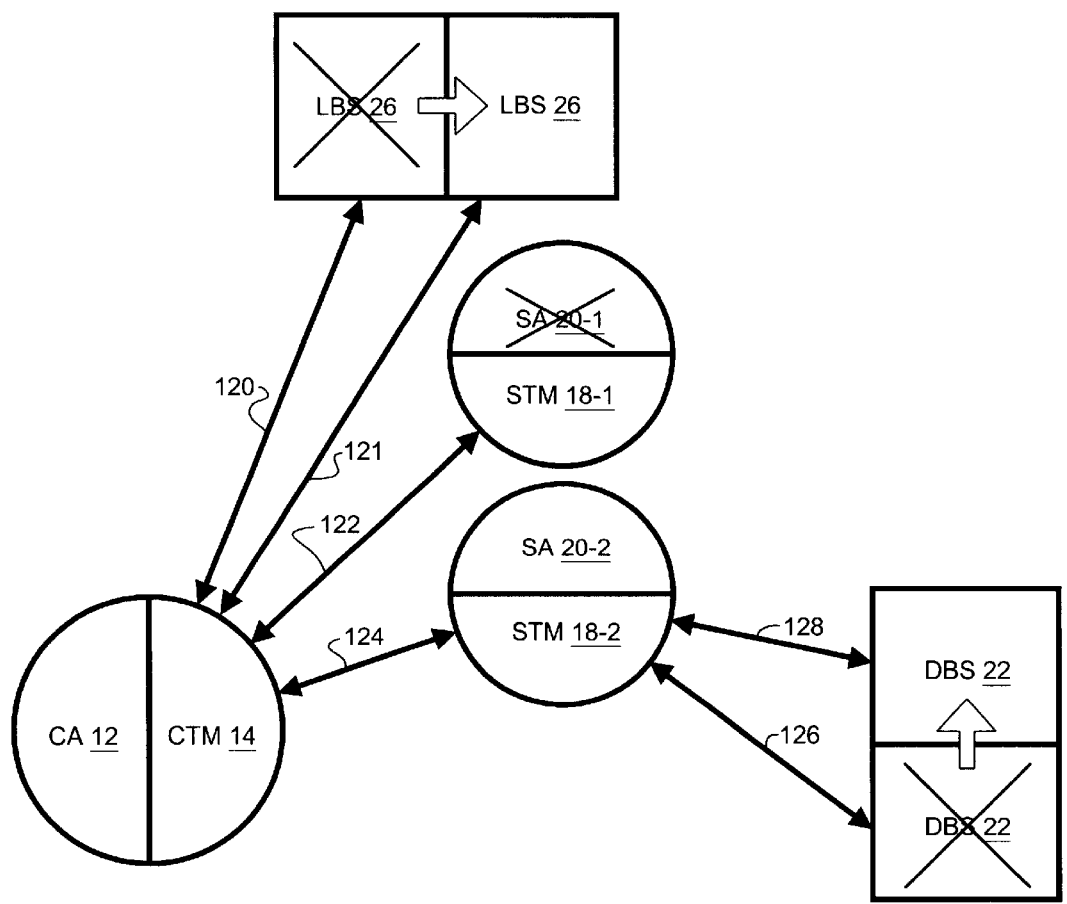
FIG. 5 is the high level architecture of the TPS incorporating the present invention showing possible failure modes and normal and alternate routings.

Referring now to FIG. 5, therein is shown a simplified schematic of the TPS 10 showing the possible failure modes and the normal and alternative routings. The CA 12/CTM 14 is connected by an arrow 120 to a failed LBS 26 and by an arrow 121 to a restarted LBS 26. It is also connected by an arrow 122 STM 18-1/SA 20-1 and by an arrow 124 to STM 18-2/SA 20-2. The STM 18-2/SA 20-2 is connected by arrow 126 to a failed DBS 22 and by an arrow 128 to a rolled back DBS 22.

As a system overview, the SAs, the STMs 18-1, 18-2, etc. register their respective SAs 20-1, 20-2, etc. with the LBS 26 at startup. When the CA 12 makes its first invocation of a SA, the CTM 14 will fetch a reference from the LBS 26 as indicated by the arrow 120. The CTM 14 then invokes the STM 18-1/SA 20-1.

If there is a failure of the SA 20-1 as shown by the "X", the SA 20-1/STM 18-1 informs the CTM 14 by the arrow 122. The CTM 14 will then fetch a reference from the LBS 26 to STM 18-2/SA 20-2. The CTM 14 then invokes the SA 20-2 through the STM 18-2. The STM 18-2 handles the database connections and performs transaction demarcation, while the SA 20-2 directly performs the actual manipulation of the database. The manipulation can be performed in a number of different languages such as Standard Query Language, SQL.

In the event of a failure of the DBS 22 as shown by the "X", the DBS 22 will provide an indication of its failure by one of a number of mechanisms, which are well known to those skilled in the art, back to the STM 18-2 as shown by the arrow 126. The DBS 22 will also restart itself, or rollback, to its last committed transaction. After the DBS 22 is restarted, the STM 18-2 will cause the communication to be established with the DBS 22 by the arrow 128.

After fetching the initial reference from the LBS 26, the CTM 14 uses this reference until it becomes invalid. In particular, the CTM 14 only communicates with the LBS initially and after failures, as indicated by the arrow 120. If there is a failure of the LBS 26 as shown by the "X", the references will be maintained in the LBS 26 and the CTM 14 will retry after the LBS 26 is restarted. There will be a failure over to the LBS 26, which then begins to supply references in the event of other component failures.

Again, it should be noted that the user 11 and the CA 12 are not involved in the recovery from the failure.

FIG. 5 is the high-level architecture and the arrows demonstrate common call paths. It is important to note that the CA 12 and the SA 20 need to know nothing about the LBS 26, the CTM 14, the STM 18, or the DBS 22.

The client transparency protocol is implementable directly in and by the CA and SAs. However, it is more desirable from a customer point of view to be implemented so that it is transparent to the user and will require little change to the CA and SA. This would make the client transparency system transportable and implementable into existing systems.

In the TPS 10, the failure recovery logic is completely separated from the application logic, while there is a well-defined interface on the SA side. This means on the CA side, the application code is not aware of the failure recovery at any time. If the CA 12 is exposed to failure (which happens rarely), it can be assumed that the failure is serious and encompasses several entities of the TPS 10 such that human user intervention is actually required.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A method of controlling a transaction processing system having a first server application, a first server transparency mechanism, and a database system connectable to a communications infrastructure, comprising the steps of:

receiving a request having a unique identification from the communications infrastructure by the first server transparency mechanism that a transaction be processed by the first server application;

processing the transaction by the first server application and communicating the transaction to the database system;

placing the unique identification and a corresponding result of the transaction processed by the first server application in the database system; and committing to the transaction between the database system and the first server transparency mechanism.

2. The method of controlling a transaction processing system as claimed in claim 1 including the steps of:

receiving an indication of an undesirable condition of the database system by the first server transparency mechanism, the database system capable of rolling back and restarting after an undesirable condition; and placing the first server application and the first server transparency mechanism in communication with the database system after it has rolled back and restarted.

3. The method of controlling a transaction processing system as claimed in claim 2 including the steps of:

determining, after the rolling back and restarting of the database system, the presence of the unique identification in the database system by the first server transparency mechanism;

providing the absence of the unique identification to the communications infrastructure; and providing the request from the communications infrastructure to the first server transparency mechanism in the absence of the unique identification that the transaction be processed by the first server application and the database system.

4. The method of controlling a transaction processing system as claimed in claim 2 including the steps of:

determining, after the rolling back and restarting of the database system, the presence of the unique identification in the database system by the first server transparency mechanism;

indicating the presence of the unique identification to the communications infrastructure; and providing an indication to the communications infrastructure from the first server transparency mechanism that the database system was committed when the unique identification is present in the database system whereby the transaction does not have to be processed again.

5. The method of controlling a transaction processing system as claimed in claim 1 including the steps of:

providing a request from a client application to a client transparency mechanism for a transaction to be processed;

providing the request from the client transparency mechanism through the communications infrastructure to the first server transparency mechanism;

receiving a committed indication from the first server transparency mechanism through the communications infrastructure by the client transparency mechanism; and providing a reply from the client transparency mechanism to the client application in response to the committed indication from the first server transparency mechanism.

6. The method of controlling a transaction processing system as claimed in claim 5 including the steps of:

responding to an undesirable condition of the first server application by the client transparency mechanism to identify a second server application having the same functionality as the first server application;

providing a rollback instruction through the communications infrastructure to the second server transparency mechanism connected to the second server application;

providing the rollback instruction from the second server transparency mechanism through the communications infrastructure to the database system;

retrieving the unique identification and the corresponding result of the transaction processed by the first server application to the database system; and sending the request from the communications infrastructure that the transaction be processed by the second server application, and the database system if the unique identification of the transaction processed by the first server application to the database system cannot be retrieved.

7. The method of controlling a transaction processing system as claimed in claim 6 including the steps of:

registering the functionality of second and third server applications through respective second and third server transparency mechanisms with a load balancing service on startup; and selecting the second server application based on the second server application having the same functionality as the first server application and on the load of the second and third server applications through respective second and third server transparency mechanisms by the load balancing service in response to an undesirable condition of the first server application.

8. The method of controlling a transaction processing system as claimed in claim 7 including the step of:

responding to an undesirable condition of the load balancing service by restarting the load balancing service.

9. A method of controlling a transaction processing system having a client application, a client transparency mechanism, first server application, a first server transparency mechanism, and a database system, comprising the steps of:

sending a request having a unique identification from the client application through the client transparency mechanism to the first server transparency mechanism, the first server transparency mechanism connected to the first server application;

starting a transaction at the database system by the first server transparency mechanism;

sending the request from the first server transparency mechanism to the first server application;

processing the transaction in the first server application and the database system;

placing the unique identification and a corresponding result of the transaction processed by the first server application to the database system;

ending the transaction between the database system and the first server transparency mechanism;

committing the transaction in the database system by the first server transparency mechanism;

providing an indication from the first server transparency mechanism to the client transparency mechanism that the transaction was committed in the database system; and providing the indication from the client transparency mechanism to the client application.

10. The method of controlling a transaction processing system as claimed in claim 9 including the steps of:

receiving an indication of an undesirable condition of the database system by the first server transparency mechanism, the database system capable of rolling back and restarting after an undesirable condition and providing an indication thereof;

retrieving the unique identification and the corresponding result of the transaction from the database system; and providing the request to the database system to reprocess the transaction if the unique identification of the transaction cannot be retrieved.

11. The method of controlling a transaction processing system as claimed in claim 9 including the steps of:

determining, after the rolling back and restarting of the database system, the presence of the unique identification and the corresponding result of the transaction in the database system by the first server transparency mechanism;

responding to the absence of the unique identification by the first server transparency mechanism to the client transparency mechanism; and providing the request by the first server transparency mechanism in response to the absence of the unique identification.

12. The method of controlling a transaction processing system as claimed in claim 11 including the step of:

responding to the universal unique identification and the corresponding result in the database system whereby a completed transaction is identified.

13. The method of controlling a transaction processing system as claimed in claim 9 including the steps of:

responding to an undesirable condition of the first server application, after saving the unique identification and the corresponding result in the database system, by the client transparency mechanism to identify a second server application having the same functionality as the first server application and having a second server transparency mechanism connected thereto;

providing a retry message from the client transparency mechanism to the second server transparency mechanism to effectuate a lookup of the unique identification to the database system;

providing the corresponding result from the database system to the second server transparency mechanism in response a lookup of the unique identification;

providing the corresponding result from the second server transparency mechanism to the client transparency mechanism; and providing the corresponding result by the client transparency mechanism to the client application whereby the corresponding result is responsive to the request.

14. The method of controlling a transaction processing system as claimed in claim 9 including the steps of:

responding to an undesirable condition of the first server application, before saving the unique identification and the corresponding result, by the client transparency mechanism to identify a second server application having the same functionality as the first server application;

providing a retry instruction to the second server application and the second server transparency mechanism from the client transparency mechanism;

providing a rollback instruction to the database system from the second server transparency mechanism whereby the database system rolls back to a last committed transaction;

sending a not found message from the second server transparency mechanism to the client transparency mechanism after the database system has been rolled back; and sending the request from the client application that the transaction be processed by the second server application.

15. The method of controlling a transaction processing system as claimed in claim 9 including the steps of:

registering the functionality of second and third server applications through respective second and third server transparency mechanisms with a load balancing service on startup and load changes;

selecting the second server application and the second server transparency mechanism based on the second server application and the second server transparency mechanism having the same functionality as the first server application and the first server transparency mechanism and on the load of the second server application being heavier than the third server application through respective second and third server transparency mechanisms by the load balancing service in response to an undesirable condition of the first server application and first server transparency mechanism;

providing a retry instruction to the second server transparency mechanism from the client transparency mechanism;

rolling back the database system in response to the rollback instruction from the second server transparency mechanism whereby the database system rolls back to a predetermined condition; and sending the request from the client application that the transaction be processed by the second server application and the database.

16. The method of controlling a transaction processing system as claimed in claim 15 including the steps of:

responding to an undesirable condition of the load balancing service by restarting the load balancing service; and placing the client transparency mechanism back in communication with the load balancing service after restarting.

17. A transaction processing system comprising:

a client application for providing a transactional request and receiving a transactional reply;

a client transparency mechanism connectable to the client application for transmitting messages to and from the client application, and for providing messages related to failures in the transaction processing system;

a first server transparency mechanism connectable to the client transparency mechanism for transmitting messages to and from the client transparency mechanism;

a first server application connectable to the first server transparency mechanism for processing the transactional request; and a database system connectable to the first server application for processing transactions therefrom, the database system providing failure indications on failure thereof and including a rollback and restarting mechanism;

the client transparency mechanism including a mechanism responsive to and for providing instructions related to failures in the first server application, the first server transparency mechanism, and the database system, and providing failure recovery capability independent of the client application;

the first server transparency mechanism including a mechanism responsive to and for providing instructions related to failures in the database system, the first server transparency mechanism providing a unique identification and a corresponding result for the transaction.

18. The transaction processing system as claimed in claim 17 wherein:

the database system includes a mechanism responsive to the failure thereof for restarting and rolling back the database system to a last committed transaction; and the first server transparency mechanism includes a mechanism responsive to the restarting and rolling back of the database system for causing the first client transparency mechanism to retry the transaction when the unique identification and the corresponding result of the last committed transaction cannot be retrieved from the database system.

19. The transaction processing system as claimed in claim 17 including:

a second server application for processing transactions and having substantially the same functionality as the first server application;

a third server application for processing transactions and having substantially the same functionality as the first server application;

an load balancing service for tracking the functionality of the first, second, and third server applications and the transaction processing loads respectively thereon;

the client transparency mechanism responsive to a failure indication of the first server application to obtain an alternate server application to communicate with from the load balancing service based on the closest functionality to the failed first server application and the transaction processing loads on the server applications.

20. The transaction processing system as claimed in claim 17 wherein:

the client transparency mechanism messages the client application only to provide a transactional reply.

* * * * *